(12) United States Patent
Yoshimura et al.

(10) Patent No.: US 7,335,392 B2
(45) Date of Patent: Feb. 26, 2008

(54) METHOD FOR PRODUCING CORROSION-RESISTANT RARE EARTH METAL-BASED PERMANENT MAGNET

(75) Inventors: Kohshi Yoshimura, Osaka (JP); Tomoiku Otani, Osaka (JP)

(73) Assignee: Neomax Co., Ltd., Osaka-shi (JP)

( * ) Notice: Subject to any disclaimer, the term of this patent is extended or adjusted under 35 U.S.C. 154(b) by 278 days.

(21) Appl. No.: 10/511,598

(22) PCT Filed: Nov. 28, 2003

(86) PCT No.: PCT/JP03/15268

§ 371 (c)(1),
(2), (4) Date: Nov. 2, 2004

(87) PCT Pub. No.: WO2004/051678

PCT Pub. Date: Jun. 17, 2004

(65) Prior Publication Data

US 2005/0233068 A1 Oct. 20, 2005

(30) Foreign Application Priority Data

Nov. 29, 2002 (JP) ............................. 2002-348841
Sep. 11, 2003 (JP) ............................. 2003-319207

(51) Int. Cl.
*B05D 5/12* (2006.01)
(52) U.S. Cl. .................. 427/127; 427/242; 145/101; 428/553; 335/306
(58) Field of Classification Search ................ 427/127, 427/242; 148/101; 428/553; 335/306
See application file for complete search history.

(56) References Cited

U.S. PATENT DOCUMENTS 2,556,744 A * 6/1951 Walrath ........................ 118/52

(Continued)

FOREIGN PATENT DOCUMENTS

JP 52-151635 12/1977

(Continued)

OTHER PUBLICATIONS

JA 2001-295071 Translation.*

(Continued)

*Primary Examiner*—Alain L. Bashore
(74) *Attorney, Agent, or Firm*—Kratz, Quintos & Hanson LLP (57) ABSTRACT

The objectives of the present invention are to provide a stable and simple method for producing a rare earth metal-based permanent magnet having on the surface thereof a corrosion-resistant film containing fine zinc particles dispersed therein, a corrosion-resistant rare earth metal-based permanent magnet produced by the method, a dip spin coating method being suitable for forming a coating film on thin type work pieces having various shapes, and a method for forming a coating film on a work piece. A method for producing a corrosion-resistant rare earth metal-based permanent magnet of the present invention, characterized in that it comprises providing an aqueous treating fluid, which contains a hydrolysis polymerization product of alkyl silicate and fine zinc particles having an average particle diameter of 1 μm to 50 μm and has a pH value of 6 to 8 and a viscosity of 1000 cP or less, applying the fluid on the surface of a rare earth metal-based permanent magnet, and subjecting the resultant magnet to a heat treatment at 250° C. to 400° C., to thereby form a corrosion-resistant film containing fine zinc particles dispersed therein.

15 Claims, 7 Drawing Sheets

U.S. PATENT DOCUMENTS

| | | | | |
|---|---|---|---|---|
| 3,269,633 | A * | 8/1966 | Bernier et al. | 228/36 |
| 3,306,602 | A * | 2/1967 | Scholer et al. | 269/55 |
| 3,734,337 | A * | 5/1973 | Garrison | 220/533 |
| 4,933,025 | A * | 6/1990 | Alson et al. | 148/104 |
| 4,988,755 | A * | 1/1991 | Dickens et al. | 524/401 |
| 6,399,150 | B1 * | 6/2002 | Yoshimura et al. | 427/242 |

FOREIGN PATENT DOCUMENTS

| | | |
|---|---|---|
| JP | 59-064671 | 4/1984 |
| JP | 59-64671 | 4/1984 |
| JP | 60-179180 | 9/1985 |
| JP | 01-197385 * | 11/1989 |
| JP | 06-64762 | 9/1994 |
| JP | 13486/1991 | 9/1994 |
| JP | 2000-160205 | 6/2000 |
| JP | 2000-309802 | 11/2000 |
| JP | 2001-230108 | 8/2001 |
| JP | 2001-295071 | 10/2001 |
| JP | 2000-309802 | 11/2002 |

OTHER PUBLICATIONS

International Search Report dated Mar. 2, 2004.

* cited by examiner

Cross section view along line C-C.

METHOD FOR PRODUCING CORROSION-RESISTANT RARE EARTH METAL-BASED PERMANENT MAGNET

TECHNICAL FIELD

The present invention relates to a stable and simple method for producing a rare earth metal-based permanent magnet having on the surface thereof a corrosion-resistant film containing fine zinc particles dispersed therein, a corrosion-resistant rare earth metal-based permanent magnet produced by the method, a dip spin coating method being suitable for forming a coating film on thin type work pieces having various shapes, and a method for forming a coating film on a work piece.

BACKGROUND ART

Rare earth metal-based permanent magnets, for instance, R—Fe—B based permanent magnets represented by a Nd—Fe—B based permanent magnet, or R—Fe—N based permanent magnets represented by a Sm—Fe—N based permanent magnet, etc., utilize inexpensive materials abundant in resources and possess high magnetic properties, and particularly among them, R—Fe—B based permanent magnets are employed today in various fields.

However, since rare earth metal-based permanent magnets contain a highly reactive rare earth element: R, they are apt to be oxidized and corroded in ambient, and in case they are used without applying any surface treatment, corrosion tends to proceed from the surface in the presence of small acidic or alkaline substance or water to generate rust, and this brings about the degradation and the fluctuation in magnetic properties. Moreover, in case such a rusty magnet is embedded in a magnetic circuit and a like device, there is fear of scattering rust as to contaminate peripheral components.

Although there are numerous methods for imparting corrosion-resistance to rare earth metal-based permanent magnets, known is a method for forming a corrosion-resistant film using a silicon compound as the starting raw material on the surface of the rare earth metal-based permanent magnet. Recently, various studies are being made with an aim to further improve the performance of such corrosion-resistant films.

For instance, in Japanese Patent Laid-Open No. 2000-182813 (Patent literature 1) is proposed a method comprising coating the surface of the rare earth metal-based permanent magnet with a treating solution comprising an aqueous solution of alkali silicate having dispersed therein fine zinc particles, and then applying a heat treatment thereto to obtain a corrosion-resistant film containing fine zinc particles dispersed therein. This method utilizes the anti-corrosive function of the film using alkali silicate as the starting raw material and the sacrificial anti-corrosive function of the fine zinc particles that is potentially base, and is expected as a method capable of imparting high corrosion resistance to the rare earth metal-based permanent magnets. However, in order to form the corrosion-resistant film containing fine zinc particles dispersed therein, this method requires the treating solution to be kept alkaline in order to maintain the fine zinc particles uniformly dispersed in the treating solution; thus, in case the treating solution is applied to the surface of the rare earth metal-based permanent magnet, hydroxides of the metal which constitutes the magnet generate on the surface of the magnet, and, due to the layer comprising such metal hydroxides covering the surface of the magnet, there occur problems such as a difficulty in forming a corrosion-resistant film containing fine zinc particles dispersed therein with high adhesive strength, a tendency in generating cracks due to the poor flexibility of the film using alkali silicate as the starting raw material, a troublesome waste liquid treatment, and the like.

Further, in Japanese Patent Laid-Open No. 2001-143949 (Patent literature 2) is proposed a method comprising coating the surface of the rare earth metal-based permanent magnet with a treating solution containing silico-organic compound and inorganic fine particles having an average particle diameter of 1 nm to 100 nm, and then applying a heat treatment thereto to obtain a corrosion-resistant film containing fine inorganic particles dispersed therein. This method is proposed in order to form a thin and dense corrosion-resistant film on the surface of the rare earth metal-based permanent magnet using a silico-organic compound as the starting raw material; the internal stress inside the film which forms during the process of the film formation can be relaxed by dispersing fine inorganic particles having the specified average particle diameter in the film component, and hence, the generation of physical defects such as cracks can be thereby prevented from occurring. This method is also expected as a method capable of imparting high corrosion resistance to the rare earth metal-based permanent magnets. However, by taking into consideration that it is difficult to uniformly disperse fine inorganic particles in the order of nanometer size in water, it is necessary for preparing a treating solution to use an organic solvent such as lower alcohol and the like as the main component with a small amount of water added therein, and to prepare a sol solution by subjecting silico-organic compound to a hydrolysis polymerization reaction under an acidic condition while simultaneously dispersing fine inorganic particles. Since the thus prepared treating solution is acidic, in case the treating solution is applied to the surface of the rare earth metal-based permanent magnet, there occur problems such as inducing corrosion of the magnet, or causing the fluctuation in the composition of the treating solution due to the volatilization of the organic solvent; furthermore, there are problems such as causing unfavorable influences to the environment, or requiring a troublesome waste solution treatment.

Accordingly, the objectives of the present invention are to provide a stable and simple method for producing a rare earth metal-based permanent magnet having on the surface thereof a corrosion-resistant film containing fine zinc particles dispersed therein, a corrosion-resistant rare earth metal-based permanent magnet produced by the method, a dip spin coating method being suitable for forming a coating film on thin type work pieces having various shapes, and a method for forming a coating film on a work piece.

DISCLOSURE OF THE INVENTION

The present invention has been accomplished in the light of the aforementioned points above, according to a first aspect and feature of the present invention, there is provided a method for producing a corrosion-resistant rare earth metal-based permanent magnet, characterized in that it comprises providing an aqueous treating fluid, which contains a hydrolysis polymerization product of alkyl silicate and fine zinc particles having an average particle diameter of 1 μm to 50 μm and has a pH value of 6 to 8 and a viscosity of 1000 cP or less, applying the fluid on the surface of a rare earth metal-based permanent magnet, and subjecting the resultant magnet to a heat treatment at 250° C. to 400° C., to thereby form a corrosion-resistant film containing fine zinc particles dispersed therein.

According to a second aspect and feature of the present invention, in addition to the first feature, the fine zinc particles are flaky particles.

According to a third aspect and feature of the present invention, in addition to the first feature, the total content of alkyl silicate as the starting raw material and fine zinc particles in the aqueous treating fluid accounts for 40 wt. % to 90 wt. % (where alkyl silicate content is converted to $SiO_2$ content).

According to a fourth aspect and feature of the present invention, in addition to the first feature, the mixing ratio of alkyl silicate as the starting raw material and fine zinc particles in the aqueous treating fluid is 1:1 to 1:19 (in weight ratio: where alkyl silicate content is converted to $SiO_2$ content).

According to a fifth aspect and feature of the present invention, in addition to the first feature, an organic dispersing agent is added in the aqueous treating fluid.

According to a sixth aspect and feature of the present invention, in addition to the first feature, the film thickness of the corrosion-resistant film containing fine zinc particles dispersed therein is 1 μm to 50 μm.

According to a seventh aspect and feature of the present invention, in addition to the first feature, other fine inorganic particles are additionally dispersed in the corrosion-resistant film containing fine zinc particles dispersed therein.

According to an eighth aspect and feature of the present invention, in addition to the first feature, the aqueous treating fluid is applied to the surface of the rare earth metal-based permanent magnet by a dip spin coating method.

According to a ninth aspect and feature of the present invention, in addition to the eighth feature, the method is carried out by using an aqueous treating fluid having a viscosity of 300 cP to 600 cP.

According to a tenth aspect and feature of the present invention, in addition to the eighth feature, the dip spin coating is carried out by supporting plural rare earth metal-based permanent magnets on approximately the outer peripheral edge portion of a turn table which is rotatable around a vertical center axis that is used as the axis of rotation, immersion coating the rare earth metal-based permanent magnets with the aqueous treating fluid by immersing the turn table having the rare earth metal-based permanent magnets supported thereon in an aqueous treating fluid tank, and after taking out the resulting turn table from the liquid, rotating the turn table to centrifugally cut off the aqueous treating fluid that has adhered in excess to the rare earth metal-based permanent magnets.

According to an eleventh aspect and feature of the present invention, in addition to the tenth feature, the plural rare earth metal-based permanent magnets are supported in approximately a ring-like arrangement on approximately the outer peripheral edge portion of the turn table.

According to a twelfth aspect and feature of the present invention, in addition to the tenth feature, the rare earth metal-based permanent magnets are thin type magnets.

According to a thirteenth aspect and feature of the present invention, in addition to the twelfth feature, the thin type magnets are supported in such a manner that the widest plane of the thin type magnet is disposed approximately in parallel with the radial direction of the turn table.

According to a fourteenth aspect and feature of the present invention, in addition to the thirteenth feature, a coating jig is used as such that in case of attaching it on approximately the outer peripheral edge portion of the turn table, each of the thin type magnets is set apart from each other with the widest plane thereof being placed approximately in parallel with the radial direction of the turn table and in approximately a ring-like arrangement.

According to a fifteenth aspect and feature of the present invention, in addition to the twelfth feature, the thin type magnets are shaped in one of the shapes selected from planar, ring-like, and arc-like shape.

According to a sixteenth aspect and feature of the present invention, in addition to the fourteenth feature, after completion of a dip spin coating, the coating jig is detached from the turn table while leaving the thin type magnets still set thereon, and the thin type magnets still set on the coating jig are subjected to a heat treatment at an arbitrary place.

According to a seventeenth aspect and feature of the present invention, there is provided a rare earth metal-based permanent magnet, characterized by having on the surface thereof a corrosion-resistant film containing fine zinc particles having an average particle diameter of 1 μm to 50 μm being dispersed in the film component using alkyl silicate as the starting raw material.

According to an eighteenth aspect and feature of the present invention, in addition to the seventeenth feature, the corrosion-resistant film contains 50 wt. % to 95 wt. % of fine zinc particles.

According to a nineteenth aspect and feature of the present invention, in addition to the seventeenth feature, zinc is diffused from the surface of the magnet body to the internal part.

According to a twentieth aspect and feature of the present invention, in addition to the seventeenth feature, it is produced by the production method according to the first feature.

According to a twenty-first aspect and feature of the present invention, there is provided a dip spin coating method for work pieces, characterized in that it comprises supporting plural work pieces on approximately the outer peripheral edge portion of a turn table which is rotatable around a vertical center axis that is used as the axis of rotation, immersion coating the work pieces with a paint by immersing the turn table having the work pieces supported thereon in a paint tank, and after taking out the resulting turn table from the liquid, rotating the turn table to centrifugally cut off the paint that has adhered in excess to the work pieces.

According to a twenty-second aspect and feature of the present invention, there is provided a method for forming a coating film on a work piece, characterized in that it comprises, a coating jig is used as such that in case of attaching it on approximately the outer peripheral edge portion of a turn table which is rotatable around a vertical center axis that is used as the axis of rotation, each of work pieces is set apart from each other in approximately a ring-like arrangement, and it further comprises immersion coating the work pieces with a paint by immersing the turn table on which the coating jig having the work pieces set thereon is attached in a paint tank; taking out the resulting turn table from the liquid and rotating the turn table to centrifugally cut off the paint that has adhered in excess to the work pieces; detaching, from the turn table, the coating jig having the work pieces still set thereon; and if desired, subjecting the work pieces still set on the coating jig to a dry treatment at an arbitrary place.

Thus, in accordance with the present invention, there are provided a stable and simple method for producing a rare earth metal-based permanent magnet having on the surface thereof a corrosion-resistant film containing fine zinc particles dispersed therein, a corrosion-resistant rare earth metal-based permanent magnet produced by the method, a dip spin coating method being suitable for forming a coating film on thin type work pieces having various shapes, and a method for forming a coating film on a work piece.

BEST MODE FOR CARRYING OUT THE INVENTION

In the present invention, a corrosion-resistant film containing fine zinc particles dispersed therein is formed by applying an aqueous treating fluid which contains a hydrolysis polymerization product of alkyl silicate and fine zinc particles having an average particle diameter of 1 µm to 50 µm and has a pH value of 6 to 8 and a viscosity of 1000 cP or less on the surface of a rare earth metal-based permanent magnet, followed by then subjecting the resultant magnet to a heat treatment at 250° C. to 400° C. The thus formed corrosion-resistant film containing fine zinc particles dispersed therein not only imparts high corrosion resistance to the rare earth metal-based permanent magnet, but also has high adhesive strength because zinc is internally diffused from the surface of the magnet body.

Alkyl silicates used herein are such expressed by the general formula: $Si_nO_{(n-1)}(OR)_{(2n+2)}$. In the formula, R represents an alkyl group exemplified by lower alkyl groups having 1 to 4 carbon atoms, such as methyl group, ethyl group, propyl group, butyl group, and the like, but suitable among them is ethyl group (i.e., ethyl silicate) because it not only is inexpensive, but also is nontoxic and has superior handling properties. Furthermore, n represents 1 or higher integer, however, in order to form a dense film, n preferably is an integer of 10 or lower.

Further, fine zinc particles having an average particle diameter of 1 µm to 50 µm are used. This is because, if the average particle diameter is smaller than 1 µm, it is feared that the fine zinc particles undergo secondary aggregation in the aqueous treating fluid; on the other hand, if the average particle diameter is larger than 50 µm, it is feared that the fine zinc particles sediment in the aqueous treating fluid; in either case, there is fear of making it difficult to prepare an aqueous treating fluid which contains fine zinc particles uniformly dispersed therein and which have excellent preservation stability. The average particle diameter of the fine zinc particles is preferably 2 µm to 30 µm, and more preferably, 5 µm to 20 µm. The fine zinc particles may be of any shape, but to minimize the generation of pinholes in the corrosion-resistant film containing fine zinc particles dispersed therein, it is advantageous if the fine zinc particles are densely laminated and packed in the component of the film; furthermore, in order to diffuse zinc from the surface of the magnet body to the internal part, it is advantageous if the fine zinc particles have a larger contact area with respect to the magnet body. Accordingly, from the above points of view, fine zinc particles are preferably flaky particles. In case fine zinc particles are flaky particles, the average particle diameter means the average major diameter.

The total content of alkyl silicate as the starting raw material and fine zinc particles in the aqueous treating fluid is preferably 40 wt. % to 90 wt. % (where alkyl silicate content is converted to $SiO_2$ content), and more preferably, 60 wt. % to 80 wt. %. If the total content should be lower than 40 wt. %, it is feared that the total process steps would be increased to more than those necessary in obtaining a corrosion-resistant film containing fine zinc particles dispersed therein at a film thickness capable of exhibiting sufficiently properties; on the other hand, if the total content should be higher than 90 wt. %, it is feared that the preservation stability of the aqueous treating fluid would be affected.

The mixing ratio of alkyl silicate as the starting raw material and fine zinc particles in the aqueous treating fluid is preferably 1:1 to 1:19 (in weight ratio: where alkyl silicate content is converted to $SiO_2$ content), and more preferably, 1:3 to 1:10, such that the content of the fine zinc particles should account for 50 wt. % to 95 wt. % of the corrosion-resistant film containing fine zinc particles dispersed therein. If the content of the fine zinc particles in the resulting -corrosion-resistant film containing fine zinc particles dispersed therein should be lower than 50 wt. %, it is feared that the effect of dispersing fine zinc particles in the film component would not be sufficiently exhibited; on the other hand, if it should be higher than 95 wt. %, it is feared that the main properties as the corrosion-resistant film using alkyl silicate as the starting raw material would not be fully exhibited.

The pH value of the aqueous treating fluid to be applied to the surface of the rare earth metal-based permanent magnet is restricted in a range of 6 to 8, because if the pH value should be lower than 6, as described in the patent literature 2 above, there is fear of bringing about corrosion of the rare earth metal-based permanent magnet; on the other hand, if the pH value should be higher than 8, as described in the patent literature 1 above, it is feared that no corrosion-resistant film containing fine zinc particles dispersed therein would be formed with high adhesive strength.

The viscosity of the aqueous treating fluid to be applied to the surface of the rare earth metal-based permanent magnet is restricted to 1000 cP or less, because if the viscosity of the aqueous treating fluid should exceed 1000 cP, it is feared that it becomes difficult to form a corrosion-resistant film containing fine zinc particles dispersed therein and having an uniform film thickness.

An aqueous treating fluid having excellent homogeneity can be prepared, preferably, for example, by adding fine zinc particles having an average particle diameter of 1 μm to 50 μm into an aqueous solution obtained by subjecting alkyl silicate to a hydrolysis polymerization reaction under an acidic condition (at a pH value of ca. 3 to 4) or under an alkaline condition (at a pH value of ca. 10 to 12), adjusting the pH value in a range of 6 to 8 and maintaining or adjusting the viscosity to 100 cP or less (the viscosity is, more preferably, 50 cP or less and further preferably, 25 cP or less). In case alkyl silicate is subjected to a hydrolysis polymerization reaction under an acidic condition, the pH value is adjusted, for instance, by using sodium hydroxide and the like. In case alkyl silicate is subjected to a hydrolysis polymerization reaction under an alkaline condition, the pH value is adjusted, for instance, by using hydrochloric acid and the like.

In order to form a dense film, alkyl silicate is subjected to a hydrolysis polymerization reaction at the stage of preparing the aqueous treating fluid. The hydrolysis polymerization reaction of alkyl silicate need not be such capable of completing the hydrolysis polymerization reaction on the entire alkyl silicate, but an embodiment as such in which a part of alkyl silicate undergoes the hydrolysis polymerization reaction is sufficient. The degree of the hydrolysis polymerization reaction can be adjusted by controlling the amount of added acid or base, or by controlling the amount of water used as the medium in carrying out the hydrolysis polymerization reaction. If the degree of the hydrolysis polymerization reaction of alkyl silicate is high, there may be a case in which the viscosity of the aqueous solution exceeds 100 cP. Even in case the viscosity should once exceed 100 cP, the viscosity can be lowered by adding warm water and the like; however, in order to achieve an aqueous treating fluid with higher homogeneity, it is preferred to properly take means, such as adding water and the like, for preventing the viscosity from exceeding 100 cP in case the viscosity of the aqueous solution tends to exceed 100 cP during the hydrolysis polymerization reaction. Furthermore, in case it is desired to control the surface tension of the aqueous treating fluid in an appropriate value or the like with an objective of increasing ease in forming a film with the desired film thickness, for instance, a cellulose-based thickener (for example, a water-soluble cellulose ether exemplified by hydroxyethyl cellulose, methyl cellulose, methyl hydroxypropyl cellulose, ethyl hydroxyethyl cellulose, methyl ethyl cellulose, and so on) and the like, maybe added in the aqueous treating fluid to adjust the viscosity thereof. In case the viscosity of the aqueous treating fluid is desired to be set to 100 cP or higher with an objective of increasing the thickness of the film to be formed, etc., it is preferred that a thickener is added into an once prepared aqueous treating fluid to increase the viscosity.

In case fine zinc particles are added into an aqueous solution obtained by subjecting alkyl silicate to a hydrolysis polymerization reaction, it is preferred to uniformly disperse the fine zinc particles in the aqueous treating fluid using an organic dispersing agent. The organic dispersing agent can be added into the aqueous treating fluid, for instance, by feeding fine zinc particles into water having added therein the organic dispersing agent, thereby preparing a fine zinc particles dispersed aqueous medium containing fine zinc particles uniformly dispersed therein, and then mixing the fine zinc particles dispersed aqueous medium with the aqueous solution obtained by subjecting alkyl silicate to a hydrolysis polymerization reaction. As the organic dispersing agent, preferably used from the viewpoint of affinity with fine zinc particles and cost are an anionic dispersing agent (for example, an aliphatic polycarboxylic acid, a salt of polyether polyester carboxylic acid, a salt of high molecular polyester acid polyamine, a salt of high molecular polycarboxylic acid long chain amine, etc.), a nonionic dispersing agent (for example, a carboxylic acid salt, a sulfonic acid salt, or an ammonium salt of polyoxyethylene alkyl ether or sorbitan ester, etc.), a high molecular dispersing agent (for example, a carboxylic acid salt, a sulfonic acid salt, or an ammonium salt of water-soluble epoxy, a styrene-acrylic acid copolymer, a glue, etc.), and the like.

Further, in order to form a corrosion-resistant film containing fine zinc particles dispersed therein at a film thickness capable of exhibiting sufficiently high properties without repeating the production process in excess, the viscosity of the aqueous treating fluid to be applied on the surface of the rare earth metal-based permanent magnet is preferably 5 cP or higher.

On applying the aqueous treating fluid on the surface of the rare earth metal-based permanent magnet, applicable are a dip coating method, a spray method, a spin coating method, a dip spin coating method, and the like. Furthermore, in order to improve the adhesive strength of the corrosion-resistant film containing fine zinc particles dispersed therein, which is formed on the surface of the rare earth metal-based permanent magnet, a sand blasting treatment or a pickling treatment may be applied to the surface of the magnet before coating the aqueous treating fluid thereon.

In order to form a coating film of aqueous treating fluid with further improved uniformity, the aqueous treating fluid is preferably applied to the surface of the rare earth metal-based permanent magnet by a dip spin coating method. In particular, a dip spin coating is preferably carried out by supporting plural rare earth metal-based permanent magnets on approximately the outer peripheral edge portion of a turn table which is rotatable around a vertical center axis that is used as the axis of rotation, immersion coating the rare earth metal-based permanent magnets with the aqueous treating fluid by immersing the turn table having the rare earth metal-based permanent magnets supported thereon in an aqueous treating fluid tank, and after taking out the resulting turn table from the liquid, rotating the turn table to centrifugally cut off the aqueous treating fluid that has adhered in excess to the rare earth metal-based permanent magnets.

As a method for forming a thin coating film on the surface of a thin type work piece at a film thickness of, for example, about 10 μm, there is sometimes employed a dip spin coating method, which comprises immersion coating the work piece with a paint by immersing the work piece in a paint tank, and after taking out the resulting work piece from the liquid, rotating it at high speed to cut off the paint that has adhered in excess to the work piece. As a dip spin coating method for thin type work pieces known in the art, for instance, there can be mentioned a method for coating an optical disk with a protective film proposed in Japanese Patent Laid-Open No. 201088/1995. This method comprises vertically setting plural substrates at a predetermined interval on the horizontal main shaft; immersing the substrates, except for the central portion, in the protective film material while rotating them at low speed around the main shaft to thereby coat the substrates with the material; drawing out the resulting product from the material; and finally, cutting off the material by high speed rotation. Furthermore, in Japanese Patent Laid-Open No. 86271/1991 is proposed a dip spin coating method characterized by that it comprises a step of centrifugally cutting off the paint, which is applied to the object to be coated that is in a state supported by a hanger in such a manner that the coating plane (flat plane) is set approximately horizontally, in which whole body inclusive of the hanger and the object to be coated is rotated around the axis of rotation set to the plumb line passing through the center of gravity of the whole body. Further, in Japanese Patent Laid-Open No. 2000-164556 is proposed a method comprising using a wafer carrier, in which a pair of supporting members having plural grooves thereon are set in such a manner that the side having the grooves thereon may be disposed faced to each other; the wafers are supported by their peripheral part with the facing grooves of the wafer carrier, and the liquid is centrifugally cut off from the plural wafers supported on the carrier by rotating the carrier in such a manner that the grooves may be faced approximately in the accelerating direction of rotation, and is dried.

In case a dip spin coating method is employed to a large number of thin type work pieces, it is preferred that an uniform coating is realized for all of the work pieces irrespective of the shape of the work pieces and without causing the fluctuation in the film thickness. However, in the light of such circumstances, all the methods described in the patent literatures above have disadvantages. More specifically, the method described in Japanese Patent Laid-Open No. 201088/1995 requires holding the work pieces by the center portion; accordingly, the method is disadvantageous in that it is only applicable to ring-shaped work pieces. Furthermore, this method comprises rotating the work pieces themselves by the friction force generated by bringing the horizontal main shaft in contact with the inner peripheral plane of the ring-shaped work pieces; accordingly, this method has a shortcoming as such that, if the friction force between the work pieces and the main shaft fluctuates, the rotation speed of the work pieces fluctuates, and it is thereby feared that an uniform coating for all of the work pieces cannot be realized. Moreover, since it is difficult to rotate the work pieces at high speed, this method also suffers another shortcoming as such that the paint adhered in excess cannot be sufficiently cut off in case a paint with high viscosity (for instance, such having a viscosity exceeding 500 cP) is applied to the surface of the work pieces. Further, in the method described in Japanese Patent Laid-Open No. 86271/1991, the flat planes of the work pieces are held approximately horizontally; accordingly, the method is disadvantageous in that there is fear of causing difference in the amount of the paint adhered to the upper and the lower planes. Furthermore, in the method described in Japanese Patent Laid-Open No. 2000-164556, the work pieces are supported in such a manner that one of the flat planes is disposed opposed to the axis of rotation; hence, the rotation speed is different for each work piece depending on the holding place. Accordingly, this method has a disadvantage as such that an uniform coating for all of the work pieces cannot be realized.

However, the dip spin coating method proposed in the present invention enables mass production of uniform coating films on thin type work pieces without generating the fluctuation in the film thickness.

The dip spin coating method proposed in the present invention is explained below by making reference to drawings where necessary, but it should be understood that the dip spin coating method proposed in the present invention is by no means limited to the description below. The dip spin coating method proposed in the present invention is applicable for the coating of work pieces of any shape, irrespective to the shape of the work piece, but it is particularly suitable for thin type work pieces of planar, ring-like, and arc-like shapes. Accordingly, in the explanation below, cases of applying the method of the present invention to the coating of planar work piece and ring-shaped work piece are selected as examples.

Figure 1:
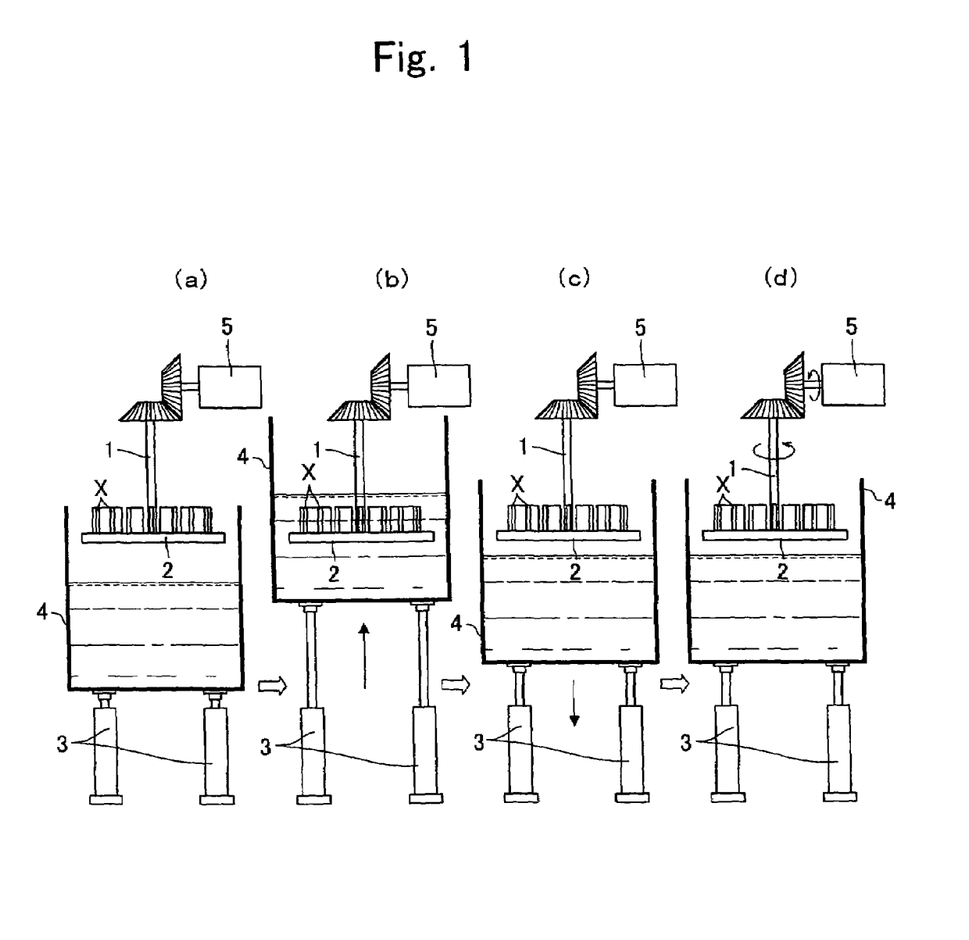
FIG. 1 is a schematic process flow diagram showing an example of a dip spin coating method for a work piece according to the present invention.

FIG. 1 is a schematic process flow diagram showing an example of a dip spin coating method proposed in the present invention. The process is described step by step below: (a) Firstly, plural planar work pieces X are supported on approximately the outer peripheral edge portion of a turn table 2 which is rotatable around a center shaft 1 set in the vertical direction which is used as the axis of rotation, in such a manner that each of the work pieces X is set with the widest plane thereof (flat plane) placed approximately in parallel with the radial direction of the turn table 2 in approximately a ring-like arrangement. (b) Then, the work pieces X are immersion coated with paint by elevating a paint tank 4 using an air cylinder 3, and by immersing the turn table 2 having supported thereon the work pieces X into the paint tank 4. (c) Subsequently, the turn table 2 is taken out of the fluid by lowering the paint tank 4 using the air cylinder 3. (d) Finally, the paint adhered in excess to the flat plane of the work pieces X is centrifugally cut off by rotating the turn table 2 by using a motor 5 around the center shaft 1 that is used as the axis of rotation (preferably, the direction of rotation is reversed at least once). According to this method, even in case a paint with relatively high viscosity (for instance, such having a viscosity exceeding 200 cP) should be used, the amount of the paint adhered to the flat plane of the work pieces X can be freely controlled by adjusting the size of the turn table 2 or by controlling the rotation speed; accordingly, the film thickness of the coating film can be freely controlled.

Preferably, mesh plane is used as the plane of the turn table 2, such that the residual paint would not form a paint reservoir.

Figure 2:
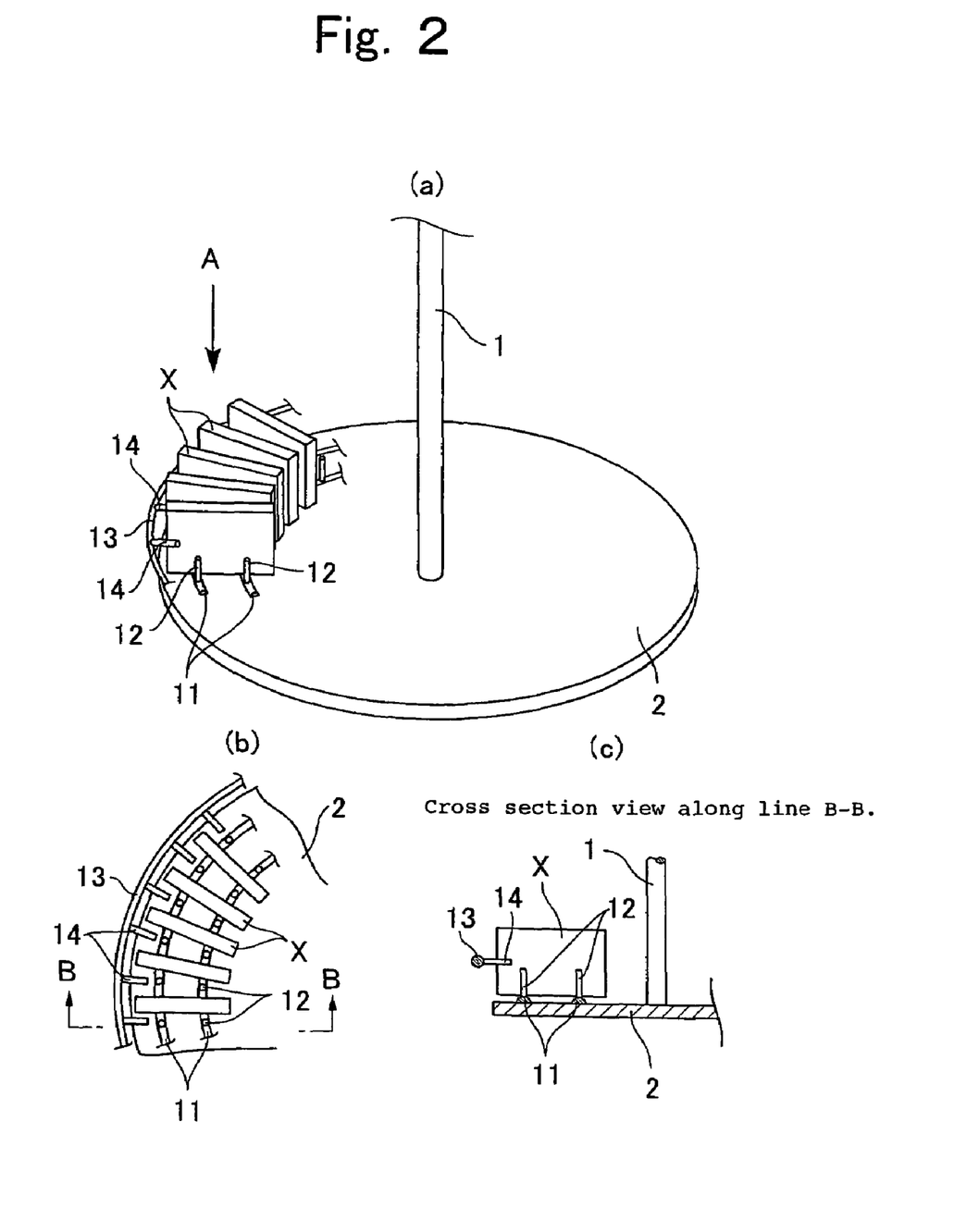
FIG. 2 is a schematic diagram showing an example of a state in which plural planar work pieces are supported on approximately the outer peripheral edge portion of a turn table according to the present invention.

FIG. 2(a) shows an oblique view of a schematically drawn part of an example of a state in which plural planar work pieces X are supported on approximately the outer peripheral edge portion of a turn table 2 in approximately a ring-like arrangement, in which the flat plane of each of the work pieces X is set approximately in parallel with the radial direction. FIG. 2(b) shows an upper planar view of the turn table 2 having supported thereon the work pieces X. The work pieces X are mounted on two supporting members 11 (preferably they are rod-like, and have a semicircle cross section) provided on the turn table 2. As shown in FIG. 1, the work pieces X may be mounted directly on the turn table 2, and by employing such a mounting method, the mounting trace that is generated on the lower plane of the work pieces X can be minimized (see FIG. 2(c)).

The planar work pieces X are supported in a state separated from each other by using spacers 12 provided in the vertical direction with respect to the supporting members 11. The spacers 12 also function as to prevent work pieces X from rolling. The interval between a spacer 12 and a neighboring spacer 12 is preferably wider than the thickness of the work piece X; because, if spacers 12 are constantly brought into contact with the both sides of the work pieces X, the contact trace becomes distinct. Furthermore, the cross section of the spacers 12 is preferably round, because the contact trace that is generated on the flat plane of the work pieces X by rotating the turn table 2 can be minimized.

Referring to process step (d), in case the paint adhered in excess to the flat plane of the planar work pieces X is centrifugally cut of f by rotating the turn table 2 around the center shaft 1 that is used as the axis of rotation by means of a motor 5, the work pieces X tend to fly out to the radial direction due to the centrifugal force, but the centrifugal fly-out regulation rods 13, which are fixed to the turn table 2 by the constitution omitted in the figure and arranged in the horizontal direction, are brought into contact with the outer side plane of the work pieces X and function as to prohibit work pieces X from flying out to the radial direction. Furthermore, the spacers 14 provided in the direction of the axis of rotation with respect to the centrifugal fly-out regulation rods 13 function as to regulate the movement of the work pieces X during their centrifugal cutting off of the paint.

Figure 3:
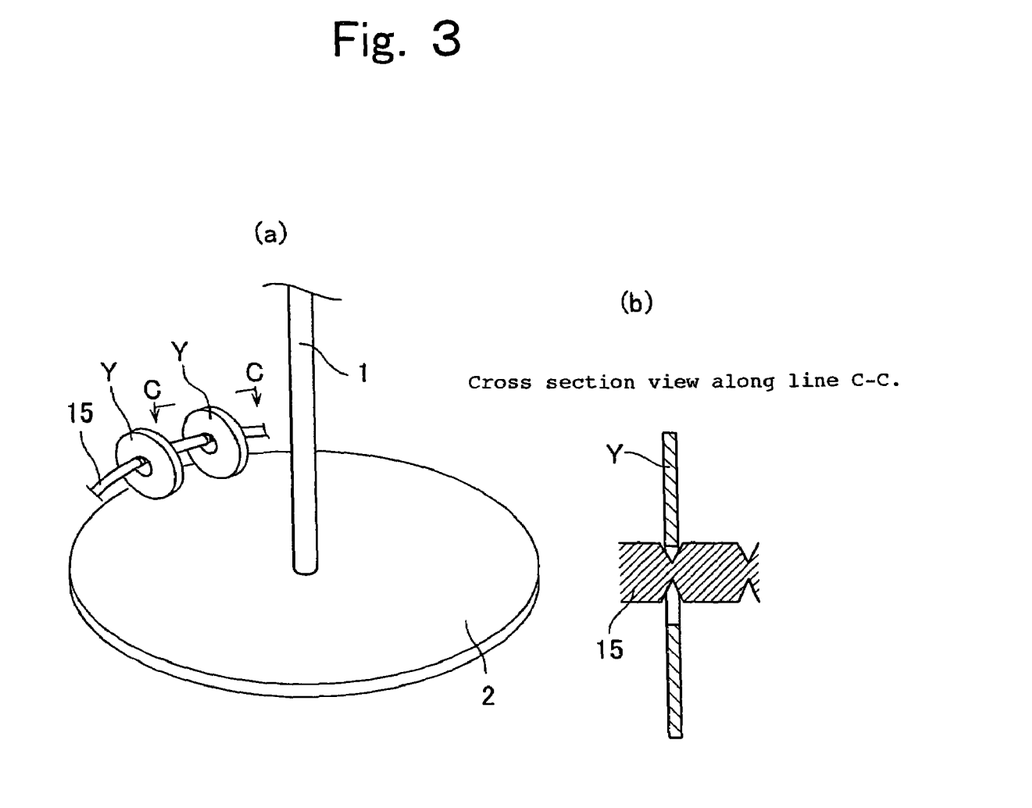
FIG. 3 is a schematic diagram showing an example of a state in which plural ring-shaped work pieces are supported on approximately the outer peripheral edge portion of a turn table according to the present invention.

FIG. 3(*a*) shows an oblique view of a schematically drawn part of an example of a state in which plural ring-shaped work pieces Y are supported on approximately the outer peripheral edge portion of a turn table 2 in approximately a ring-like arrangement, in which the flat plane of each of the work pieces Y is set approximately in parallel with the radial direction. The work pieces Y are supported to the turn table 2 by hanging the ring portion of the work pieces Y to horizontal hook members 15 fixed to the turn table 2 by the constitution omitted in the figure. The horizontal hook members 15 are preferably rod-like ones having a round cross section. Furthermore, it is preferred that the part of the horizontal hook members 15 onto which the work pieces Y are hung is cut, for example, in a V shape (see FIG. 3(*b*)). By employing such a constitution for the horizontal hook members 15, the hooking trace that is generated on the ring portion of the work pieces Y can be minimized.

In case of applying a dip spin coating to plural thin type work pieces, each of the thin type work pieces may be directly supported on the turn table as shown in FIGS. 1 to 3; however, it is also possible to use a coating jig which is capable of setting each of the thin type work pieces apart from each other with the widest plane thereof being placed approximately in parallel with the radial direction of the turn table and in approximately a ring-like arrangement, in case of attaching it on approximately the outer peripheral edge portion of a turn table.

Figure 4:
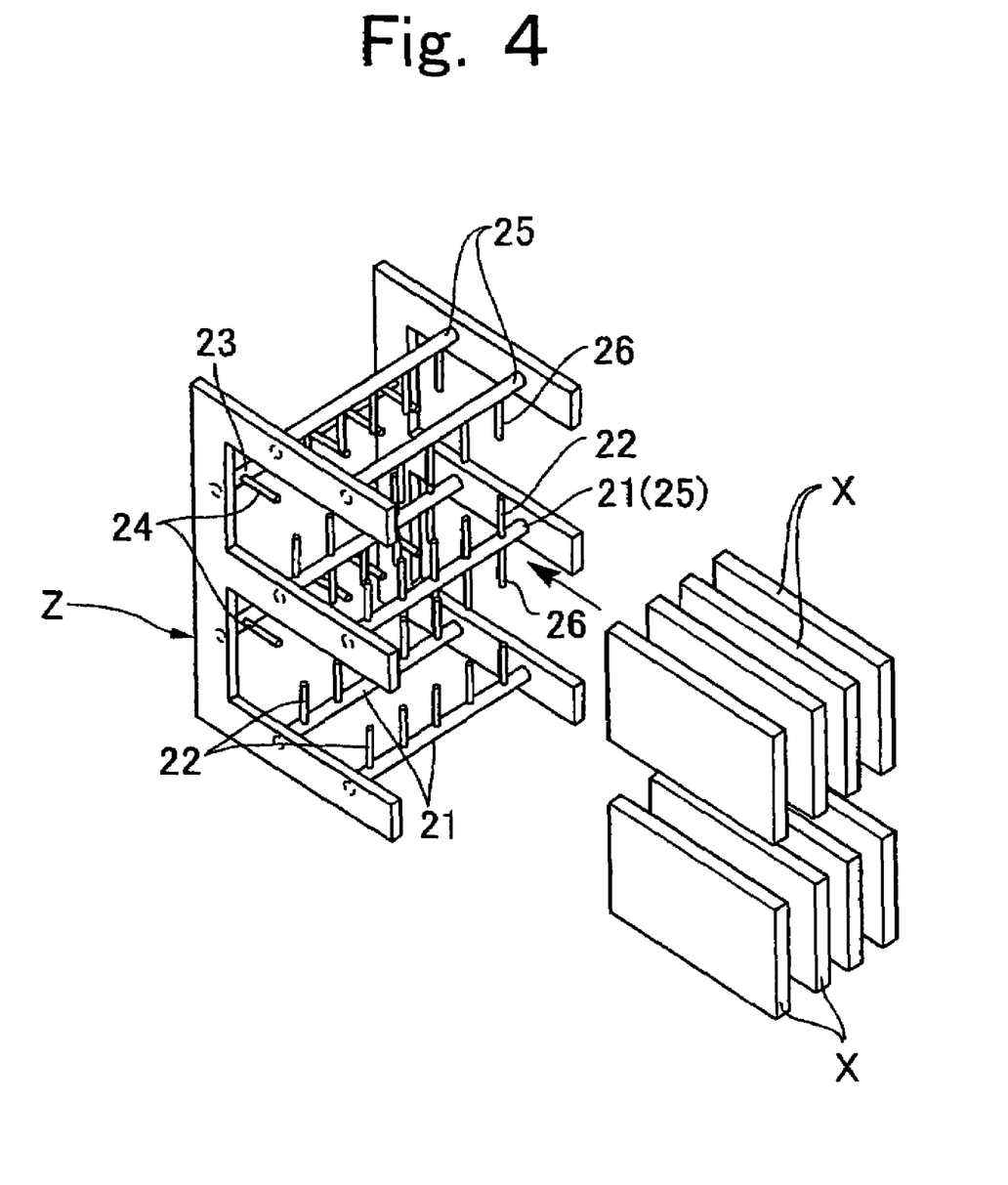
FIG. 4 is a schematic oblique view of an example of a coating jig according to the present invention.

FIG. 4 shows a schematically drawn oblique view of, in case of attaching on approximately the outer peripheral edge portion of a turn table, an example of a coating jig capable of setting each of the planar work pieces apart from each other with the flat plane thereof being placed approximately in parallel with the radial direction of the turn table and in approximately a ring-like arrangement. The coating jig Z at least comprises two supporting rods 21 with spacers 22, which are arranged in parallel with the horizontal direction and used for supporting plural planar work pieces X set apart from each other and in such a manner that the flat planes thereof are set approximately in parallel with the vertical direction, and centrifugal fly-out regulation rods 23 with spacers 24, which are arranged in parallel with the horizontal direction, are brought into contact with the outer side plane of the work pieces X and function as to prohibit work pieces X from flying out to the radial direction due to the centrifugal force in case the jig having the work pieces X set thereon is attached on approximately the outer peripheral edge portion of the turn table, and the turn table is rotated; however, it also comprises, on the upper side of the supporting rods 21, two rod-like members 25 with spacers 26 which are arranged in parallel with the supporting rods 21, in such a manner that the plural work pieces X may maintain the flat planes approximately in parallel with the vertical direction with appropriate intervals kept among them, and that space is kept between the upper part of the work pieces X and the supporting rods 21 in case the jig is reversed upside down. The supporting rods 21 for holding the work pieces X in the upper stage function as rod-like members 25 in case the jig is reversed upside down.

Figure 5:
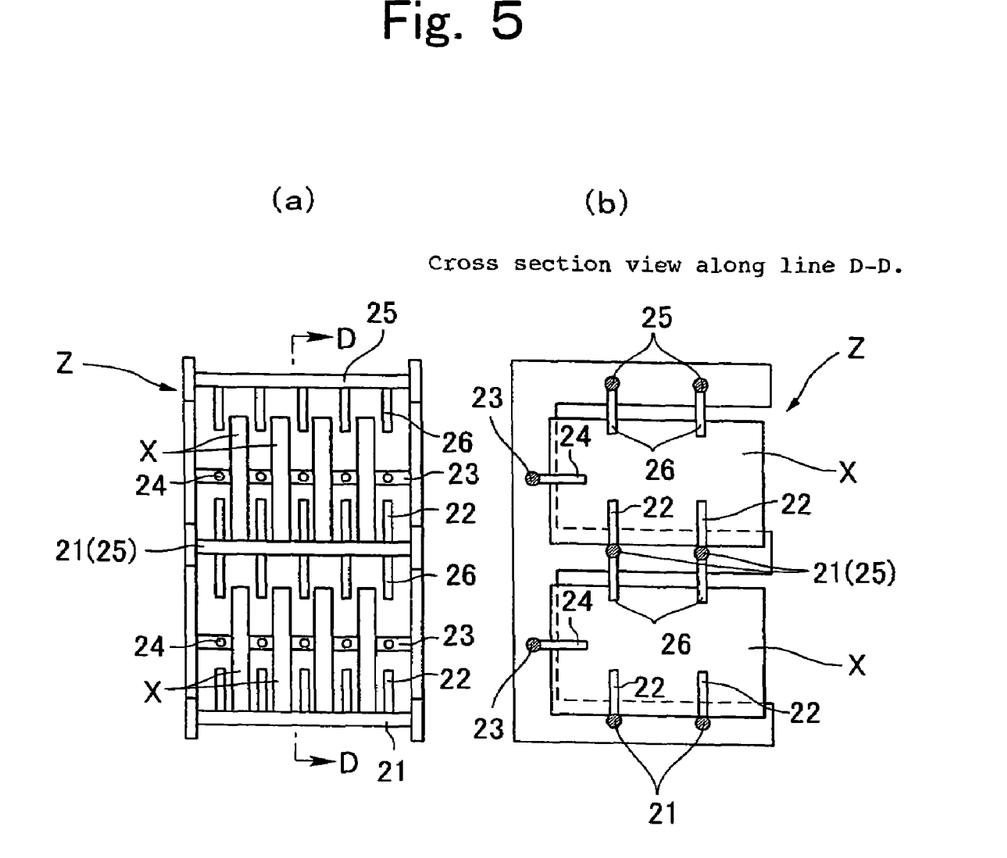
FIG. 5 is a schematic diagram showing a coating jig having plural planar work pieces set thereon according to the present invention.

FIG. 5 shows a schematic front view (a) and a cross section view along line D-D (b) of a coating jig Z having plural thin type work pieces X set thereon.

The supporting rods 21 and rod-like members 25 each preferably have a circular cross section. In this manner, the mounting trace that is generated on the lower plane of the thin type work pieces X can be minimized. Furthermore, the centrifugal fly-out regulation rods 23 preferably have a circular cross section. In this manner, the contact trace that is generated on the outer side plane of the thin type work pieces X can be minimized. Also, the spacers 22, spacers 24, and spacers 26 each preferably have a circular cross section. In this manner, the contact trace that is generated on the flat plane of the thin type work pieces X can be minimized. Further, the supporting rods 21 as well as rod-like members 25 need not consist of two pieces each, and may consist of only one piece each.

Figure 6:
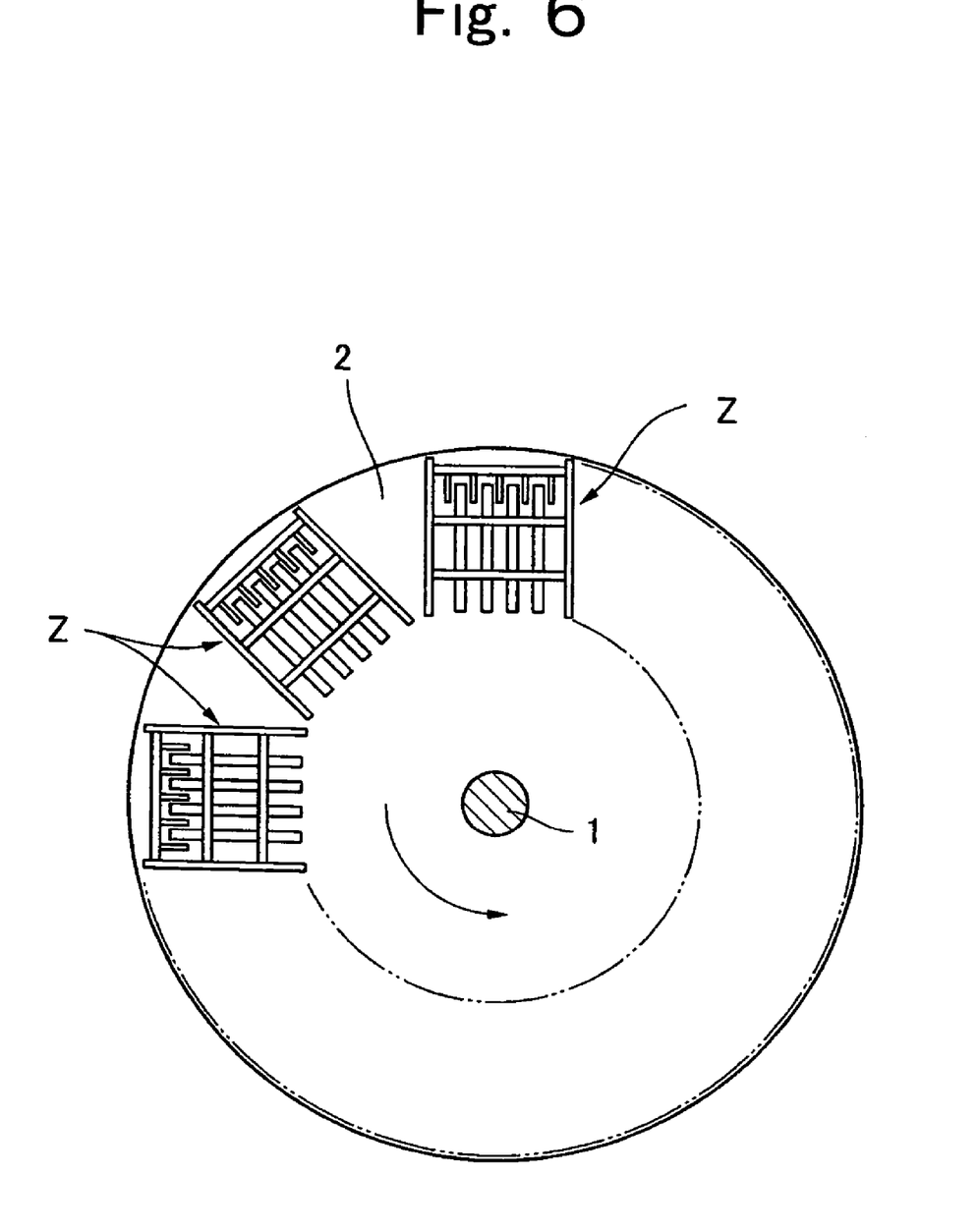
FIG. 6 is a schematic diagram showing an example of a state in which a coating jig having plural planar work pieces set thereon is attached on approximately the outer peripheral edge portion of a turn table according to the present invention.

The coating jig Z shown in FIG. 4, for example, can be used as follows. FIG. 6 is a schematic diagram showing a planar view of a part of an example of a state in which the coating jig Z having plural planar work pieces X set thereon is attached on approximately the outer peripheral edge portion of a turn table 2 using a known freely detachable attaching means. The work pieces X are immersion coated with a paint by immersing the turn table 2 having attached thereon the coating jig Z having the work pieces X set thereon into a paint tank 4, in according with the schematic process flow diagram shown in FIG. 1; i.e., by elevating the paint tank 4 using an air cylinder 3. Then, the paint tank 4 is lowered by using the air cylinder 3 to take out the turn table 2 from the liquid. Finally, the dip spin coating is completed by rotating the turn table 2 by using a motor 5 around the center shaft 1 that is used as the axis of rotation, to thereby centrifugally cut off the paint adhered in excess to the flat plane of the work pieces X. After passage of an arbitrary duration of time, the coating jig Z having the work pieces X still set thereon is detached from the turn table 2, and if desired, the work pieces X, which are still set on the coating jig Z, are subjected to a dry treatment (natural drying or hot drying) at an arbitrary place. Then, the coating jig Z having the work pieces X still set thereon is reversed upside down and attached again on the turn table 2, such that the dip spin coating is carried out in a process similar to that above. In this manner, the positions of the mounting trace and the contact trace generated in the second coating can be differed from those generated in the first coating, and the mounting trace and the contact trace generated in the first coating can be coated in the second coating; thus, a more uniform coating can be applied to the work pieces X. Subsequently, the coating jig Z having the work pieces X still set thereon is detached from the turn table 2, and if desired, the work pieces X, which are still set on the coating jig Z, are subjected to a dry treatment (natural drying or hot drying) at an arbitrary place; in this manner, a uniform coating film can be efficiently formed on a large number of work pieces without causing the fluctuation in the film thickness.

Further, in case of coating the aqueous treating fluid on the surface of the rare earth metal-based permanent magnet by a dip spin coating method, a more uniform coating film can be formed by using an aqueous treating fluid having a viscosity of 300 cP to 600 cP. Preferably, the aqueous treating fluid having such a viscosity is, as described above, such having its viscosity increased by adding a cellulose based thickener into an once prepared aqueous treating fluid (preferably, the thickener is added in such a manner that it accounts for 1 wt. % to 2 wt. % of the aqueous treating fluid).

The heat treatment of the rare earth metal-based permanent magnet having the coating film of the aqueous treating fluid formed on the surface thereof is carried out at 250° C. to 400° C. By carrying out the heat treatment under such temperature conditions, a part of the fine zinc particles contained in the aqueous treating fluid is properly diffused from the surface of the magnet body to the internal part during the process of forming the film, and a corrosion-resistant film containing fine zinc particles dispersed therein can be formed with high adhesive strength. If the temperature of the heat treatment should be lower than 250° C., not only insufficient diffusion of zinc would take place, but also water remains on the surface of the rare earth metal-based permanent magnet without being sufficiently evaporated, and it is thereby feared that such water may cause corrosion of the magnet; on the other hand, if the temperature of the heat treatment should be higher than 400° C., it is feared that the diffusion of zinc may excessively take place to cause unfavorable influences to the magnetic properties. The time duration of the heat treatment is preferably, for example, 10 minutes to 120 minutes. A further homogeneous corrosion-resistant film containing fine zinc particles dispersed therein can be formed by carrying out the heat treatment after once carrying out pre-drying at 100° C. to 170° C. on the rare earth metal-based permanent magnet having the aqueous treating fluid coating applied to the surface thereof.

The corrosion-resistant film containing fine zinc particles dispersed therein is preferably formed in such a manner that the film thickness thereof falls in a range of 1 μm to 50 μm, and more preferably, in a range of 5 μm to 15 μm. If the film thickness should be less than 1 μm, it is feared that the properties necessary for a corrosion-resistant film containing fine zinc particles dispersed therein would not be sufficiently exhibited; on the other hand, if the film thickness should exceed 50 μm, it is feared that the effective volume as a rare earth metal-based permanent magnet would not be sufficiently acquired.

Further, other fine inorganic particles may be additionally dispersed in the corrosion-resistant film containing fine zinc particles dispersed therein. As the fine inorganic particles, there may be mentioned fine particles of metals that are potentially base similar to zinc, for instance, aluminum, tin, manganese, magnesium, titanium, nickel, and the like. By dispersing fine aluminum particles together with fine zinc particles, for example, the generation of white rust (basic zinc carbonate) due to the corrosion of fine zinc particles can be effectively prevented from occurring. Furthermore, in order to further reduce pinholes that may be generated in the film while further improving the corrosion resistance of the film, there may be dispersed fine particles of oxides such as $Al_2O_3$, $TiO_2$, $SiO_2$, mica, and the like together with fine zinc particles in the film. In case fine inorganic particles are dispersed together with fine zinc particles, the total weight of the fine zinc particles and the fine inorganic particles preferably accounts for 95 wt. % or less of the formed corrosion-resistant film.

As rare earth metal-based permanent magnets, there can be mentioned, for instance, known R—Fe—B based permanent magnets represented by an Nd—Fe—B based permanent magnet, and R—Fe—N based permanent magnets represented by a Sm—Fe—N based permanent magnet, etc. Among them, R—Fe—B based permanent magnets are particularly preferred from the viewpoint of possessing high magnetic properties and of having excellent mass productivity as well as economical advantage. The rare earth metal-based permanent magnets may be sintered magnets or bonded magnets.

The rare earth element (R) of the rare earth metal-based permanent magnets is preferably at least one selected from Nd, Pr, Dy, Ho, Tb, and Sm; or at least one selected from La, Ce, Gd, Er, Eu, Tm, Yb, Lu, and Y.

In general, one of the aforementioned rare earth metals is sufficient for use as R, but in practice, from the viewpoint of ease in availability and the like, it is possible to use a mixture of two or more (misch metal, didymium and the like).

Furthermore, by adding at least one selected from Al, Ti, V, Cr, Mn, Bi, Nb, Ta, Mo, W, Sb, Ge, Sn, Zr, Ni, Si, Zn, Hf, and Ga, it is possible to improve the coercive force, the rectangularity of a demagnetizing curve, and productivity, or to reduce cost. Additionally, by substituting a part of Fe with Co, the temperature characteristics of the resulting magnet can be improved without impairing the magnetic properties.

EXAMPLES

The present invention is explained in further detail below by means of examples and comparative examples, but it should be understood that the present invention is not limited thereto.

Example 1

As the starting raw materials, electrolytic iron, ferroboron, and Nd as R, were blended to give the predetermined magnet composition, and after melting and casting, the resulting product was coarsely crushed and finely ground by a mechanical crushing method to obtain a fine powder having a granularity in a range of 3 μm to 10 μm. The fine powder thus obtained was shaped under a magnetic field of 10 kOe, sintered under argon atmosphere at 1100° C. for 1 hour, and the resulting sinter was subjected to aging treatment at 600° C. for 2 hours to obtain a magnetic body having a composition of 15Nd-7B-78Fe, from which a 36 mm×32 mm×3 mm size planar sintered magnet test piece was cut out to be subjected to the following experiments.

A. An aqueous solution containing 20 wt. % of ethyl silicate (where ethyl silicate content was converted to $SiO_2$ content) as the starting raw material was prepared by adding Ethyl silicate 40 (a colorless transparent liquid containing 40 wt. % of ethyl silicate: where ethyl silicate content was converted to $SiO_2$ content) in water, and by subjecting the resulting product to a hydrolysis polymerization reaction by adjusting the pH value thereof to 3 with 1N hydrochloric acid. This aqueous solution thus prepared was mixed with an aqueous medium containing fine zinc particles dispersed therein, which was prepared by adding an organic dispersing agent (Trademark: Solsperse S20000: produced by Avecia Limited) and flaky fine zinc particles having an average major diameter of 20 μm (approximately 20 μm×20 μm×1 μm in size) in water; and after thoroughly stirring the resulting product, the pH value thereof was adjusted to 7 by using 1N sodium hydroxide. Thus was obtained an aqueous treating fluid having a viscosity of 15 cP and containing ethyl silicate as the starting raw material and fine zinc particles at a total content of 70 wt. % (whereethyl silicate content was converted to $SiO_2$ content), in which ethyl silicate as the starting raw material, fine zinc particles, and the organic dispersing agent were contained at a mixing ratio of 9.9:90:0.1 (in weight ratio; where ethyl silicate was content was converted to $SiO_2$ content).

B. The test piece was subjected to ultrasonic washing (degreasing treatment) in ethanol, and after naturally drying for 15 minutes, it was immersed in the aqueous treating fluid above. The test piece taken out from the aqueous treating fluid was set inside a centrifugal drying machine, was rotated at 300 rpm for 30 seconds to cut off the aqueous treating fluid adhered in excess to the surface of the test piece, and was pre-dried in air at 100° C. for 5 minutes. In this manner, the test piece subjected to pre-drying of the aqueous treating fluid coating to the surface thereof was immersed in the aqueous treating fluid again. The aqueous treating fluid adhered in excess to the surface of the test piece taken out from the aqueous treating fluid was removed in the same manner as above, and a heat treatment was applied in air at 320° C. for 10 minutes to the test piece having the coating film of the aqueous treating fluid formed on the surface thereof, to thereby form a corrosion-resistant film containing fine zinc particles dispersed therein at a fine zinc particles content of 90 wt. % on the surface of the test piece. The film thickness of the thus formed corrosion-resistant film containing fine zinc particles dispersed therein was found to be about 10 μm (from observation of the cross section).

C. Corrosion resistance test comprising spraying 5% brine at 35° C. for 500 hours was performed on the thus produced ten test pieces having on the surface thereof the corrosion-resistant film containing fine zinc particles dispersed therein, and found no change in appearance (no rust generation) on any of the test pieces after the test.

Example 2

An aqueous solution having a pH value of 3 and containing 20 wt. % of ethyl silicate (where ethyl silicate was content was converted to $SiO_2$ content) as the starting raw material was prepared in the same manner as in Example 1. This aqueous solution thus prepared was mixed with an aqueous medium containing fine zinc particles and fine aluminum particles dispersed therein, which was prepared by adding an organic dispersing agent (Trademark: Solsperse S20000: produced by Avecia Limited), flaky fine zinc particles having an average major diameter of 20 μm (approximately 20 μm×20 μm×1 μm in size), and fine granular aluminum particles having an average diameter of 3 μm in water, and after thoroughly stirring the resulting product, the pH value thereof was adjusted to 7 by using 1N sodium hydroxide. Thus was obtained an aqueous treating fluid having a viscosity of 13 cP and containing ethyl silicate as the starting raw material, fine zinc particles, and fine aluminum particles at a total content of 70 wt. % (where ethyl silicate content was converted to $SiO_2$ content), in which ethyl silicate as the starting raw material, fine zinc particles, fine aluminum particles, and the organic dispersing agent were contained at a mixing ratio of 9.9:60:30:0.1 (in weight ratio; where ethyl silicate content was converted to $SiO_2$ content). The resulting aqueous treating fluid was used to form a corrosion-resistant film containing fine zinc particles and fine aluminum particles dispersed therein at a fine zinc particles content of 60 wt. % and a fine aluminum particles content of 30 wt. % on the surface of the same test piece as in Example 1 in the same manner as in Example 1. The film thickness of the thus formed corrosion-resistant film containing fine zinc particles and fine aluminum particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles and fine aluminum particles dispersed therein, and found no change in appearance (no rust generation) on any of the test pieces after the test.

Example 3

An aqueous solution having a pH value of 3 and containing 20 wt. % of ethyl silicate (where ethyl silicate was content was converted to $SiO_2$ content) as the starting raw material was prepared in the same manner as in Example 1. This aqueous solution thus prepared was mixed with an aqueous medium containing fine zinc particles, fine aluminum particle, and fine tin particles dispersed therein, which was prepared by adding an organic dispersing agent (Trademark: Solsperse S20000: produced by Avecia Limited), flaky fine zinc particles having an average major diameter of 20 μm (approximately 20 μm×20 μm×1 μm in size), fine granular aluminum particles having an average diameter of 3 μm, and fine granular tin particles having an average diameter of 3 μm in water, and after thoroughly stirring the resulting product, the pH value thereof was adjusted to 7 by using 1N sodium hydroxide. Thus was obtained an aqueous treating fluid having a viscosity of 18 cP and containing ethyl silicate as the starting raw material, fine zinc particles, fine aluminum particles, and fine tin particles at a total content of 70 wt. % (where ethyl silicate was content was converted to $SiO_2$ content), in which ethyl silicate as the starting raw material, fine zinc particles, fine aluminum particles, fine tin particles, and the organic dispersing agent were contained at a mixing ratio of 9.9:55:25:10:0.1 (in weight ratio; where ethyl silicate was content was converted to $SiO_2$ content). The resulting aqueous treating fluid was used to form a corrosion-resistant film containing fine zinc particles, fine aluminum particles and fine tin particles dispersed therein at a fine zinc particles content of 55 wt. %, a fine aluminum particles content of 25 wt. % and a fine tin particles content of 10 wt. % on the surface of the same test piece as in Example 1 in the same manner as in Example 1. The film thickness of the thus formed corrosion-resistant film containing fine zinc particles, fine aluminum particles, and fine tin particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles, fine aluminum particles, and fine tin particles dispersed therein, and found no change in appearance (no rust generation) on any of the test pieces after the test.

Comparative Example 1

A. An aqueous solution of alkaline sodium silicate having a pH value of 12 and $SiO_2/Na_2O$ ratio of 4.0 was prepared. This aqueous solution thus prepared was mixed with an aqueous medium containing fine zinc particles dispersed therein, which was prepared by adding an organic dispersing agent (Trademark: Solsperse S20000: produced by Avecia Limited) and flaky fine zinc particles having an average major diameter of 20 μm (approximately 20 μm×20 μm×1 μm in size) in water, and the resulting product was thoroughly stirred. Thus was obtained a treating solution containing alkaline sodium silicate as the starting raw material and fine zinc particles at a total content of 70 wt. % (where alkaline sodium silicate content was converted to $SiO_2$ content), in which alkaline sodium silicate as the starting raw material, fine zinc particles, and the organic dispersing agent were contained at a mixing ratio of 9.9:90:0.1 (in weight ratio; where alkaline sodium silicate content was converted to $SiO_2$ content).

B. The same test piece as in Example 1 subjected to ultrasonic washing (degreasing treatment) in ethanol and to natural drying for 15 minutes was immersed in the treating solution above. The test piece taken out from the treating solution was set inside a centrifugal drying machine, was rotated at 300 rpm for 30 seconds to cut off the treating solution adhered in excess to the surface of the test piece, and was pre-dried in air at 100° C. for 5 minutes. In this manner, the test piece subjected to pre-drying of the treating solution coating to the surface thereof was immersed in the treating solution again. The treating solution adhered in excess to the surface of the test piece taken out from the treating solution was removed in the same manner as above, and a heat treatment was applied in air at 150° C. for 30 minutes to the test piece having the coating film of the treating solution formed on the surface thereof, to thereby form a corrosion-resistant film containing fine zinc particles dispersed therein at a fine zinc particles content of 90 wt. % on the surface of the test piece. The film thickness of the thus formed corrosion-resistant film containing fine zinc particles dispersed therein was found to be about 10 μm (from observation of the cross section).

C. Corrosion resistance test comprising spraying 5% brine at 35° C. for 500 hours was performed on the thus produced ten test pieces having on the surface thereof the corrosion-resistant film containing fine zinc particles dispersed therein, and found that 7 test pieces showed change in appearance (rust generation) at time passage of 200 hours.

Example 4

Figure 7:
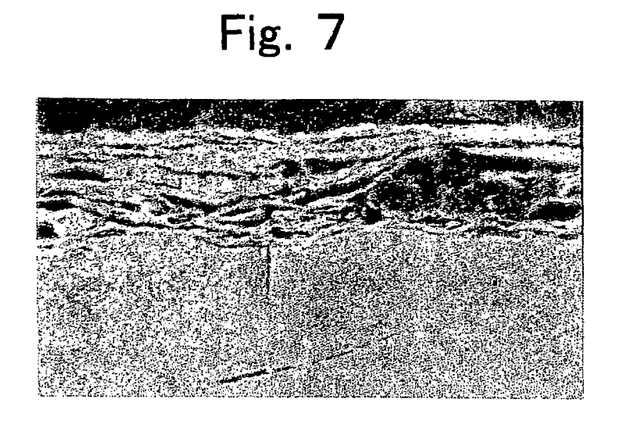
FIG. 7 is a secondary electron image obtained by EPMA in Example 4.
Figure 8:
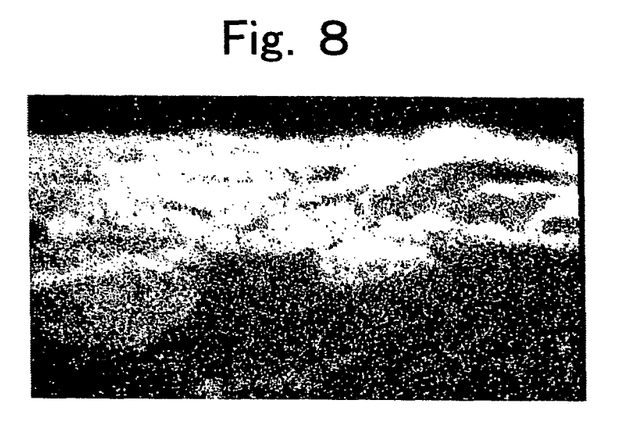
FIG. 8 is an X-ray image of zinc obtained in the same example.
Figure 9:
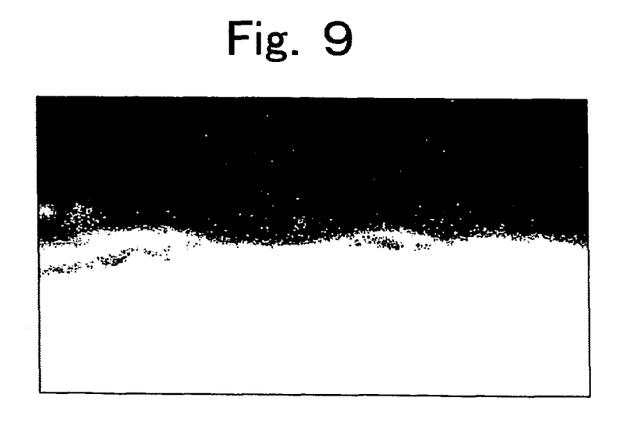
FIG. 9 is an X-ray image of iron obtained in the same example.

An alloy powder consisting of particles having an average major diameter of 150 μm and having a composition of 12 atomic % Nd, 77 atomic % Fe, 6 atomic % B, and 5 atomic % Co was prepared by a rapid solidification process, and was kneaded with epoxy resin added at a concentration of 2 wt. %. The resulting mixture was compression molded under a pressure of 686 $N/mm^2$, followed by curing at 150° C. for 1 hour to obtain a ring-shaped bonded magnet test piece having an outer diameter of 30 mm, an inner diameter of 28 mm, and a length of 4 mm. The test piece was subjected to an experiment similar to that of Example 1 to form on the surface thereof a corrosion-resistant film containing fine zinc particles dispersed therein at a fine zinc particles content of 90 wt. %. The film thickness of the thus formed corrosion-resistant film containing fine zinc particles dispersed therein was found to be about 10 μm (from observation of the cross section). Furthermore, observation of the cross section in the vicinity of the surface of the test piece having on the surface thereof the corrosion-resistant film containing fine zinc particles dispersed therein was performed by using an EPMA (electron probe micro analyzer; EPM810 manufactured by Shimadzu Corp.). In FIG. 7 is given the secondary electron image. In FIG. 8 is given the X-ray image of zinc. In FIG. 9 is given the X-ray image of iron. From FIGS. 7 to 9, it has been found that zinc has been diffused from the surface of the test piece body to the internal part. No degradation in magnetic properties of the test piece itself due to zinc diffusion was observed. Corrosion resistance test comprising spraying 5% brine at 35° C. for 500 hours was performed on the thus produced ten test pieces having on the surface thereof the corrosion-resistant film containing fine zinc particles dispersed therein, and found no change in appearance (no rust generation) on any of the test pieces after the test.

Example 5

The viscosity of the aqueous treating fluid prepared in Example 1 was adjusted to 450 cP by adding hydroxyethyl cellulose as a thickener in such a manner that it accounts for 1 wt. % of the aqueous treating liquid. A large number of the same test pieces as in Example 1 subjected to ultrasonic washing (degreasing treatment) in ethanol and to natural drying for 15 minutes were set on a coating jig shown in FIG. 4, and the coating jig having the test pieces set thereon was attached on approximately the outer peripheral edge portion of the turn table as shown in FIG. 6 to perform a dip spin coating as shown in FIG. 1 by using the treating solution above (centrifugally cutting off it was carried out at 300 rpm for 30 seconds). Thereafter, the coating jig having the test pieces still set thereon was taken out from the turn table and the test pieces still set on the coating jig were pre-dried in air at 130° C. for 10 minutes; subsequently, a heat treatment was applied in air at 350° C. for 30 minutes to the test pieces having the coating films of the aqueous treating fluid formed on the surface thereof. Then, the coating jig having the test pieces still set thereon was reversed upside down, and was attached again on the turn table, such that a dip spin coating, a pre-drying, and a heat treatment were carried out in a process similar to that above to form a corrosion-resistant film containing fine zinc particles dispersed therein at a fine zinc particles content of 90 wt. % on the surface of the test pieces. The film thickness of the thus formed corrosion-resistant film containing fine zinc particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles dispersed therein, and found no change in appearance (no rust generation) on any of the test pieces after the test.

Example 6

The viscosity of the aqueous treating fluid prepared in Example 2 was adjusted to 440 cP by adding hydroxyethyl cellulose as a thickener in such a manner that it accounts for 1 wt. % of the aqueous treating liquid. By using this treating solution thus obtained, a corrosion-resistant film containing fine zinc particles and fine aluminum particles dispersed therein at a fine zinc particles content of 60 wt. % and a fine aluminum particles content of 30 wt. % was formed in a similar manner as in Example 5 on the surface of the same test pieces as in Example 1 subjected to ultrasonic washing (degreasing treatment) in ethanol and to natural drying for 15 minutes. The film thickness of the thus formed corrosion-resistant film containing fine zinc particles and fine aluminum particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles and fine aluminum particles dispersed therein, and found no change in appearance (no rust generation) on any of the test pieces after the test.

Example 7

The viscosity of the aqueous treating fluid prepared in Example 3 was adjusted to 460 cP by adding hydroxyethyl cellulose as a thickener in such a manner that it accounts for 1 wt. % of the aqueous treating liquid. By using this treating solution thus obtained, a corrosion-resistant film containing fine zinc particles, fine aluminum particles, and fine tin particles dispersed therein at a fine zinc particles content of 55 wt. %, a fine aluminum particles content of 25 wt. % and a fine tin particles content of 10 wt. % was formed in a similar manner as in Example 5 on the surface of the same test pieces as in Example 1 subjected to ultrasonic washing (degreasing treatment) in ethanol and to natural drying for 15 minutes. The film thickness of the thus formed corrosion-resistant film containing fine zinc particles, fine aluminum particles, and fine tin particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles, fine aluminum particles, and fine tin particles dispersed therein, and found no change in appearance (no rust generation) on any of the test pieces after the test.

Example 8

An aqueous solution having a pH value of 3 and containing 20 wt. % of ethyl silicate (where alkaline sodium silicate content was converted to $SiO_2$ content.) as the starting raw material was prepared in the same manner as in Example 1. This aqueous solution thus prepared was mixed with an aqueous medium containing fine zinc particles, fine aluminum particles, fine tin particles, and fine alumina particles dispersed therein, which was prepared by adding an organic dispersing agent (Trademark: Solsperse S20000: produced by Avecia Limited), flaky fine zinc particles having an average major diameter of 20 μm (approximately 20 μm×20 μm×1 μm in size), fine granular aluminum particles having an average diameter of 3 μm, fine granular tin particles having an average diameter of 3 μm, and fine alumina particles having an average diameter of 1 μm in water; and after thoroughly stirring the resulting product, the pH value thereof was adjusted to 7 by using 1N sodium hydroxide. Thus was obtained an aqueous treating fluid having a viscosity of 16 cP and containing ethyl silicate as the starting raw material, fine zinc particles, fine aluminum particles, fine tin particles, and fine alumina particles at a total content of 70 wt. % (where alkaline sodium silicate content was converted to $SiO_2$ content), in which ethyl silicate as the starting raw material, fine zinc particles, fine aluminum particles, fine tin particles, fine alumina particles, and the organic dispersing agent were contained at a mixing ratio of 9.9:55:25:8:2:0.1 (in weight ratio; where alkaline sodium silicate content was converted to $SiO_2$ content). The viscosity of the aqueous treating fluid thus prepared was adjusted to 465 cP by adding hydroxyethyl cellulose as a thickener in such a manner that it accounts for 1 wt. % of the aqueous treating liquid. By using this treating solution thus obtained, a corrosion-resistant film containing fine zinc particles, fine aluminum particles, fine tin particles, and fine alumina particles dispersed therein at a fine zinc particles content of 55 wt. %, a fine aluminum particles content of 25 wt. %, a fine tin particles content of 8 wt. % and a fine alumina particles content of 2 wt. % was formed in a similar manner as in Example 5 on the surface of the same test pieces as in Example 1 subjected to ultrasonic washing (degreasing treatment) in ethanol and to natural drying for 15 minutes. The film thickness of the thus formed corrosion-resistant film containing fine zinc particles, fine aluminum particles, fine tin particles, and fine alumina particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles, fine aluminum particles, fine tin particles, and fine alumina particles dispersed therein, and found no change in appearance (no rust generation) on any of the test pieces after the test.

Comparative Example 2

The viscosity of the treating solution prepared in Comparative Example 1 was adjusted to 420 cP by adding hydroxyethyl cellulose as a thickener in such a manner that it accounts for 1 wt. % of the treating solution. By using this treating solution thus obtained, a corrosion-resistant film containing fine zinc particles dispersed therein at a fine zinc particles content of 90 wt. % was formed on the surface of the same test pieces as in Example 1 subjected to ultrasonic washing (degreasing treatment) in ethanol and to natural drying for 15 minutes, in a similar manner as in Example 5, except for setting the pre-drying condition and the heat treatment condition similar to those employed in Comparative Example 1. The film thickness of the thus formed corrosion-resistant film containing fine zinc particles dispersed therein was found to be about 10 μm (from observation of the cross section). Corrosion resistance test was performed in the same manner as in Example 1 on the thus produced ten test pieces having on the surface thereof the corrosion-resistant film containing fine zinc particles dispersed therein, and found that 6 test pieces showed change in appearance (rust generation) at time passage of 200 hours.

INDUSTRIAL APPLICABILITY

The present invention has industrial applicability in the point that it provides a stable and simple method for producing a rare earth metal-based permanent magnet having on the surface thereof a corrosion-resistant film containing fine zinc particles dispersed therein, a corrosion-resistant rare earth metal-based permanent magnet produced by the method, a dip spin coating method being suitable for forming a coating film on thin type work pieces having various shapes, and a method for forming a coating film on a work piece.

The invention claimed is:

1. A method for producing a corrosion-resistant rare earth metal-based permanent magnet, characterized in that it comprises providing an aqueous treating fluid, which contains a hydrolysis polymerization product of alkyl silicate and zinc particles having an average particle diameter of 1 μm to 50 μm and has a pH value of 6 to 8 and a viscosity of 1000 cP or less, applying the fluid on the surface of a rare earth metal-based permanent magnet, and subjecting the resultant magnet to a heat treatment at 250° C. to 400° C., to thereby form a corrosion-resistant film containing zinc particles dispersed therein.

2. The production method as claimed in claim 1, characterized in that the zinc particles are flaky particles.

3. The production method as claimed in claim 1, characterized in that the total content of alkyl silicate as the starting raw material and zinc particles in the aqueous treating fluid accounts for 40 wt.% to 90 wt.% (where alkyl silicate content is converted to $SiO_2$ content).

4. The production method as claimed in claim 1, characterized in that the mixing ratio of alkyl silicate as the starting raw materials and zinc particles in the aqueous treating fluid is 1:1 to 1:19 (in weight ratio: where alkyl silicate content is converted to $SiO_2$ content).

5. The production method as claimed in claim 1, characterized in that an organic dispersing agent is added in the aqueous treating fluid.

6. The production method as claimed in claim 1, characterized in that the film thickness of the corrosion-resistant film containing zinc particles dispersed therein is 1 μm to 50 82 m.

7. The production method as claimed in claim 1, characterized in that other inorganic particles are additionally dispersed in the corrosion-resistant film containing zinc particles dispersed therein.

8. The production method as claimed in claim 1, characterized in that the aqueous treating fluid is applied to the surface of the rare earth metal-based permanent magnet by a dip spin coating method.

9. The production method as claimed in claim 8, characterized in that the method is carried out by using an aqueous treating fluid having a viscosity of 300 cP to 600 cP.

10. The production method as claimed in claim 8, characterized in that the dip spin coating is carried out by supporting plural rare earth metal-based permanent magnets on approximately the outer peripheral edge portion of a turn table which is rotatable around a vertical center axis that is used as the axis of rotation, immersion coating the rare earth metal-based permanent magnets with the aqueous treating fluid by immersing the turn table having the rare earth metal-based permanent magnets supported thereon in an aqueous treating fluid tank, and after taking out the resulting turn table from the liquid, rotating the turn table to centrifugally cut off the aqueous treating fluid that has adhered in excess to the rare earth metal-based permanent magnets.

11. The production method as claimed in claim 10, characterized in that the plural rare earth metal-based permanent magnets are supported in approximately a ring-like arrangement on approximately the outer peripheral edge portion of the turn table.

12. The production method as claimed in claim 10, characterized in that the magnets are shaped in one of the shapes selected from planar, ring-like, and arc-like shape.

13. The production method as claimed in claim 12, characterized in that the magnets are supported in such a manner that the widest plane of the magnet is disposed approximately in parallel with the radial direction of the turn table.

14. The production method as claimed in claim 13, characterized in that, a coating jig is used as such that in case of attaching it on approximately the outer peripheral edge portion of the turn table, each of the magnets is set apart from each other with the widest plane thereof being placed approximately in parallel with the radial direction of the turn table and in approximately a ring-like arrangement.

15. The production method as claimed in claim 14, characterized in that, after completion of a dip spin coating, the coating jig is detached from the turn table while leaving the magnets still set thereon, and the magnets still set on the coating jig are subjected to a heat treatment.

* * * * *